(12) United States Patent
Wang et al.

(10) Patent No.: US 7,536,030 B2
(45) Date of Patent: May 19, 2009

(54) REAL-TIME BAYESIAN 3D POSE TRACKING

(75) Inventors: Qiang Wang, Beijing (CN); Weiwei Zhang, Beijing (CN); Xiaoou Tang, Beijing (CN); Heung-Yeung Shum, Beijing (CN)

(73) Assignee: Microsoft Corporation, Redmond, WA (US)

(*) Notice: Subject to any disclaimer, the term of this patent is extended or adjusted under 35 U.S.C. 154(b) by 660 days.

(21) Appl. No.: 11/290,135

(22) Filed: Nov. 30, 2005

(65) Prior Publication Data

US 2007/0122001 A1 May 31, 2007

(51) Int. Cl.
*G06K 9/00* (2006.01)
(52) U.S. Cl. ....................... 382/103; 382/154
(58) Field of Classification Search ................. None
See application file for complete search history.

(56) References Cited

U.S. PATENT DOCUMENTS 6,937,745 B2 * 8/2005 Toyama ...................... 382/103

OTHER PUBLICATIONS

Rahimi et al., Reducing Drift in Parametric Motion Tracking, Computer Vision, 2001. ICCV 2001. Proceedings. Eighth IEEE International Conference on, vol. 1, Jul. 7-14, 2001 pp. 315-322 vol. 1.*

Vacchetti et al., "Stable Real-Time 3D Tracking Using Online and Offline Information," Pattern Analysis and Machine Intelligence, IEEE Transactions on, vol. 26, Issue 10, Oct. 2004 pp. 1385-1391.*

* cited by examiner

*Primary Examiner*—Charles Kim
(74) *Attorney, Agent, or Firm*—Lee & Hayes, PLLC

(57) ABSTRACT

Systems and methods are described for real-time Bayesian 3D pose tracking. In one implementation, exemplary systems and methods formulate key-frame based differential pose tracking in a probabilistic graphical model. An exemplary system receives live captured video as input and tracks a video object's 3D pose in real-time based on the graphical model. An exemplary Bayesian inter-frame motion inference technique simultaneously performs online point matching and pose estimation. This provides robust pose tracking because the relative pose estimate for a current frame is simultaneously estimated from two independent sources, from a key-frame pool and from the video frame preceding the current frame. Then, an exemplary online Bayesian frame fusion technique infers the current pose from the two independent sources, providing stable and drift-free tracking, even during agile motion, occlusion, scale change, and drastic illumination change of the tracked object.

16 Claims, 6 Drawing Sheets

REAL-TIME BAYESIAN 3D POSE TRACKING

BACKGROUND

Real-time 3-dimensional (3D) object pose tracking is used in many computer vision applications such as Human Computer Interaction (HCI) and Augmented Reality (AR). The problem of estimating rigid pose transformation relating one 2-dimensional (2D) image to known 3D geometry has been studied intensively. Common closed form solutions need three or four 2D-to-3D point correspondences to estimate the pose. But since these solutions are based on the root of high degree polynomial equations and do not use redundancy in the data, the estimation result is susceptible to noise. Nonlinear optimization-based methods apply Gauss-Newton or Levenberg-Marquardt algorithms to the pose estimation problem. These methods rely on a good initial guess to converge to a correct solution and are generally slow to achieve convergence. The conventional iterative linear method has been developed by employing the specific geometric structure of the pose estimation problem during optimization. Techniques based on this method require little computational cost, which is appealing for real-time processing. However, all of the above conventional techniques are based solely on point correspondence, which is thereby made critical for pose tracking.

For solving conventional temporal pose tracking problems, the various methods can be divided into two groups. In the first group, the methods estimate the incremental pose changes between neighboring frames by registering a model with the image directly, which either presupposes that there are known model features whose image projection can be determined, or that there is a template image with known pose so that the registration between the template and the current image can be carried out. The main drawback is that fixed model features can be unstable in the event of visual occlusion of the tracked object or facial expression change. Further, appearance change between the template and the current image can be substantial due to varying illumination levels-thus, the registration between them becomes difficult. In the second group are differential tracking techniques, which estimate incremental pose changes via incremental motion estimation between neighboring frames. These techniques can essentially make use of arbitrary features on a model surface and do not have to model the more complex global appearance change. The main problem with these techniques is their differential character, which makes them suffer from accumulated drift. This drift limits their effectiveness in long video sequences.

Key-frames can be used to reduce motion drift in the above differential techniques. One conventional algorithm fuses online and offline key-frame information to achieve real-time stable tracking performance. There are still some limitations, however. Firstly, in case of agile motion (i.e., quick movement, often aperiodic), the feature point matching between neighboring frames becomes unreliable and can cause the tracker to fail. Secondly, when the key-frames are also obtained online, they can also have inherent drift and the drift error can propagate. Thirdly, the fusion of the previous online information and information from only one key-frame is performed in a merely heuristic manner that cannot guarantee optimal performance in the presence of image uncertainties, such as occlusion, rapid motion, illumination change, expression change, agile motion, macroscopic scale change etc.

SUMMARY

Systems and methods are described for real-time Bayesian 3D pose tracking. In one implementation, exemplary systems and methods formulate key-frame based differential pose tracking in a probabilistic graphical model. An exemplary system receives live captured video as input and tracks a video object's 3D pose in real-time based on the graphical model. An exemplary Bayesian inter-frame motion inference technique simultaneously performs online point matching and pose estimation. This provides robust pose tracking because the relative pose estimate for a current frame is simultaneously estimated from two independent sources, from a key-frame pool and from the video frame preceding the current frame. Then, an exemplary online Bayesian frame fusion technique infers the current pose from the two independent sources, providing stable and drift-free tracking, even during agile motion, occlusion, scale change, and drastic illumination change of the tracked object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

The disclosure describes how to perform real-time Bayesian 3D pose tracking. Exemplary systems and methods formulate key-frame based differential pose tracking in a general Bayesian tracking framework—a probabilistic graphical model. Thus, an exemplary system receives video, such as live captured video, as input and tracks a video object's 3D pose in real-time. Such a system has many uses, such as following the movements and facial expressions of an online gaming character; monitoring an infant via tracking the infant's head position via camera; predicting body motion from head and face position cues (for example, in boxing or dance); etc. In video conferencing, an exemplary real-time Bayesian 3D tracker can correct, in an ongoing manner, the position of a face that is at a slightly undesirable angle due to camera position, so that the face of the participant appears "straight on."

Based on the exemplary Bayesian tracking framework, an exemplary method provides more reliable inter-frame motion estimation results than conventional techniques by using feature matching and pose estimation, jointly. That is, in real-time, two largely independent techniques—feature (point) matching between the current frame and the preceding frame; and pose difference estimation relative to a key-frame selected from a pool of key-frames—are used to infer a current 3D position of a visual object being displayed in 2D. If one of the two techniques is temporarily weak, then the other still provides reliable relative pose estimation. Inputs from these two different techniques can be processed by an exemplary online Bayesian frame fusion method.

Bayesian fusion means that the joint distribution of the observed and the hidden data is previously estimated in some manner. The Bayesian frame fusion method improves tracking performance by having the capacity to use multiple key-frames to reduce the effect of key-frame drift (e.g., since drift from key-frames with opposite motion directions can cancel each other). A final maximum aposteriori (MAP) pose result, i.e., the current pose state of the object being tracked—is estimated based on fusion density, which is intuitively appropriate and provides stable tracking and great robustness when there are uncertainties in the video images, such as occlusion of the object being tracked, rapid and agile motion, illumination changes, facial expression changes, macroscopic scale change, etc. Extensive experiments have shown that the exemplary systems and methods to be described herein are superior in performance and robustness over conventional state-of-the-art pose tracking techniques.

Exemplary System

Figure 1:
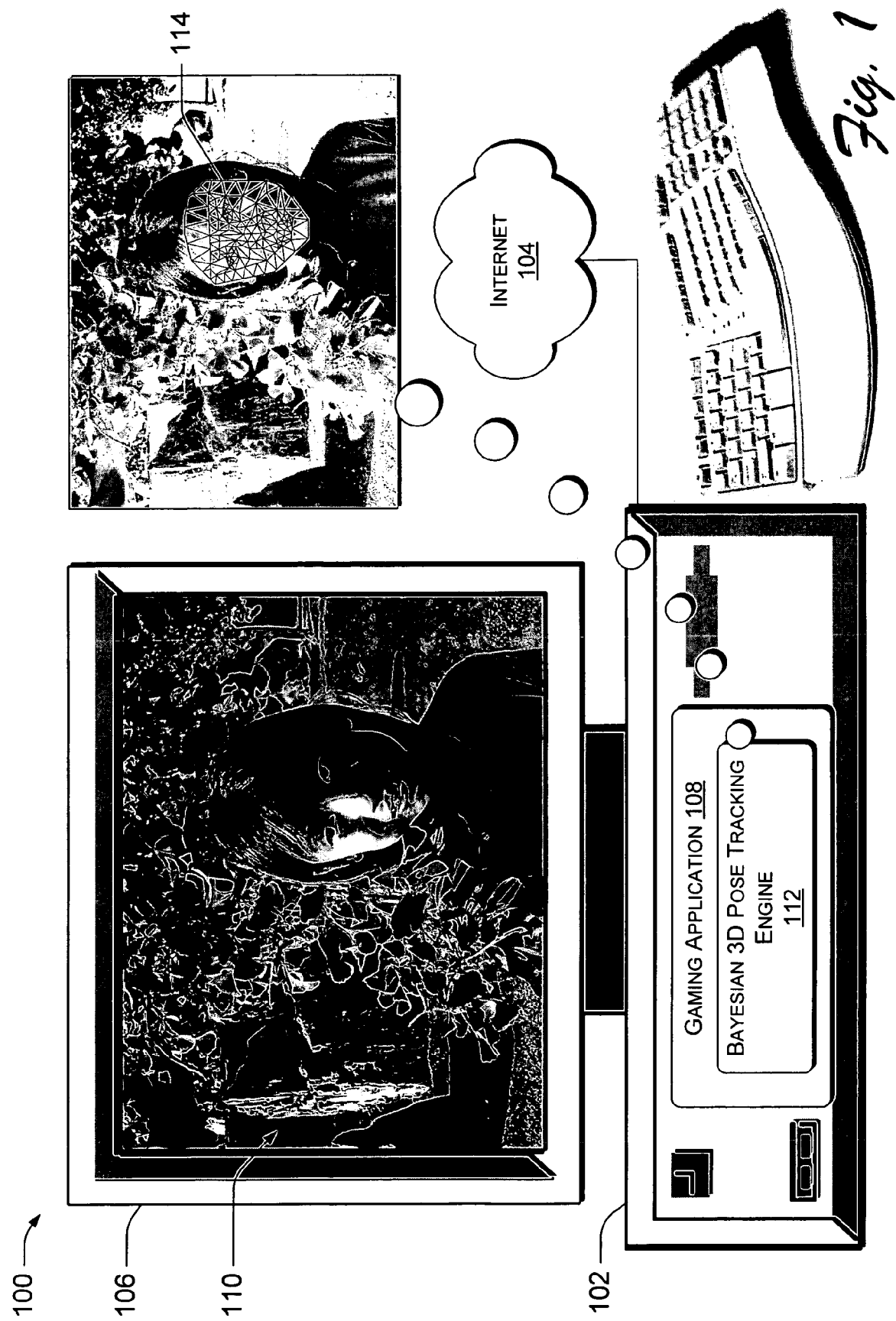
FIG. 1 is a diagram of an exemplary online Bayesian 3D pose tracking system.

FIG. 1 shows an exemplary online Bayesian 3D pose tracking system 100. A computing device 102 connected to the Internet 104 has a display monitor 106 on which an application, such as a gaming application 108, generates 2D video content 110. A Bayesian 3D pose tracking engine 112 models and tracks the movements and changing 3D attitudes of the features of a face being tracked, from frame to frame throughout a video sequence.

Figure 2:
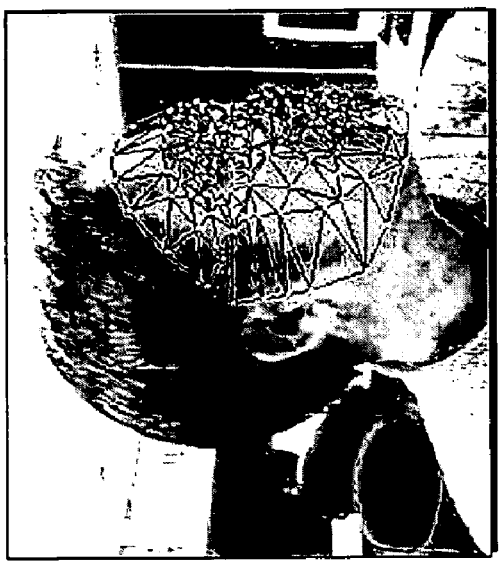
FIG. 2 is a diagram of exemplary poses of a face tracked by the exemplary system of FIG. 1.
Figure 2:
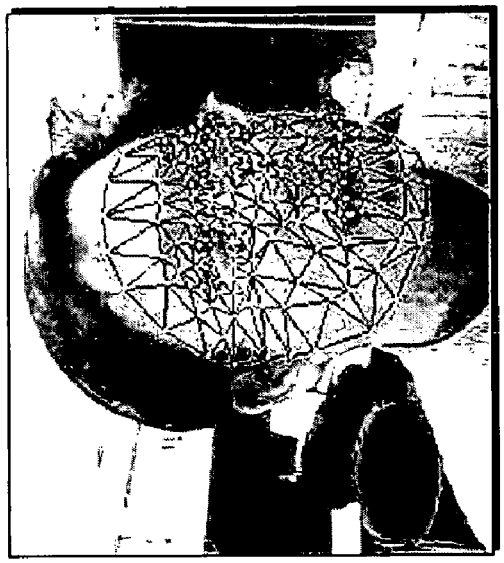
Figure 2:
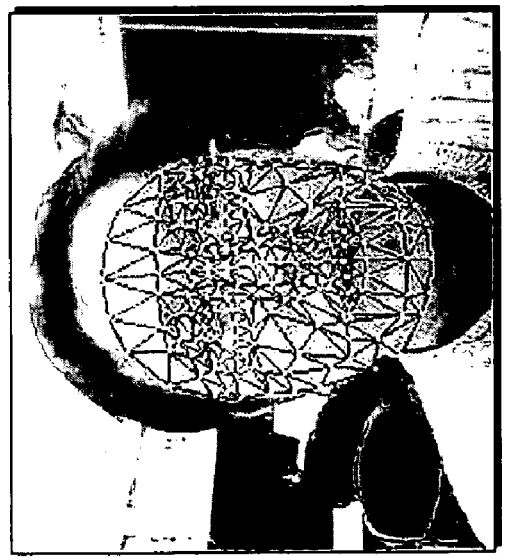
Figure 3:
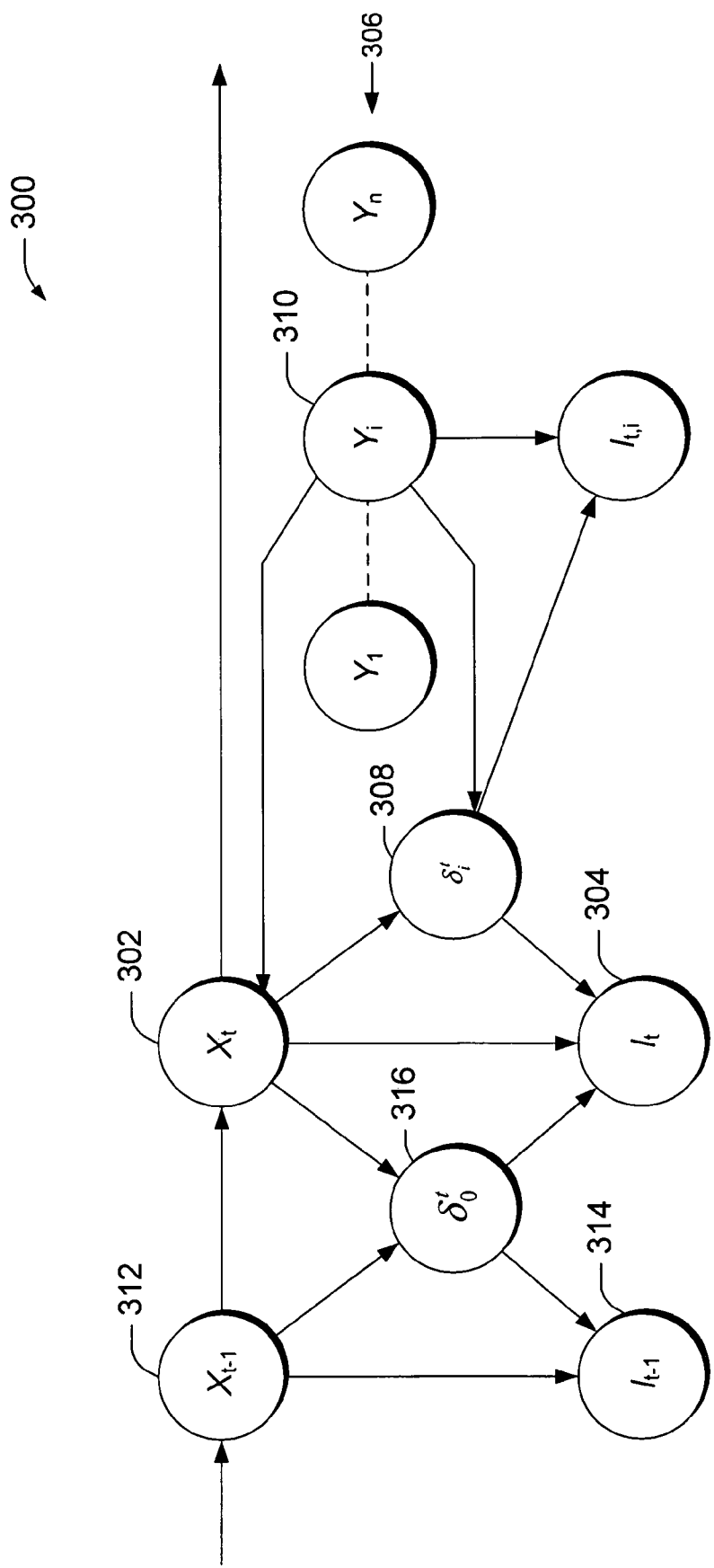
FIG. 3 is a diagram of an exemplary probabilistic graphical model for performing the exemplary online Bayesian 3D pose tracking.

As shown in FIG. 2, the current "position" of the face, including its size, orientation with respect to the 2D viewing surface of a display screen, rotation matrix, translation vector rotation, etc., is referred to as the "pose." Referring to FIG. 1 (and FIG. 2), the tracked 3D pose 114 is illustrated as a mesh of connected lines on the face, and although an exemplary pose tracking engine 112 can actually display these lines, the lines are typically not displayed but merely represent the mathematical interrelation of point facial features that the tracking has tracked.

Robustness means that the exemplary pose tracking engine 112 does not lose its lock on the selected feature points from frame to frame or over a series of frames, even though there may be quick movement, which is hard to follow, or visual interference such as occlusion of the face, that makes the feature points being tracked temporarily unavailable for the tracking. The beauty of using the exemplary Bayesian framework for such tracking is that the current position of a point facial feature is calculated at least in part from probabilities based on past states of the facial feature and other facial features. So, the exemplary pose tracking engine 112 is not easily disturbed from successful pose tracking by uncertainties in the video that conventional techniques find hard to follow. In an ongoing manner, the exemplary Bayesian pose tracking engine 112 calculates where a facial feature is likely to be, based on its priors, and thus is not as dependant as conventional techniques on a given point facial feature actually being visible and in ideal presentation for tracking. Like a person who can correctly gauge the likely position of a moving object when it temporarily disappears behind another object, the exemplary Bayesian pose tracking engine 112 can track a 3D pose robustly, based in part on probability, even when visual information is missing.

Exemplary Bayesian Differential Pose Tracking with Key-frames

The exemplary Bayesian pose tracking method is based in part on the Bayes' concept of determining the probability that a random event A occurred given knowledge that a related event B occurred, i.e., the probability of A given B. This determination is sometimes called the "posterior," since it is computed after other information on A and B is known. A Bayesian network (also called a Bayesian belief network or just a belief network) can be represented as a directed graph embodying the Bayes' concept stated above. The nodes of the graph represent variables, and arcs of the graph represent dependence relations among the variables. A Bayesian network, then, is a representation of the joint distribution over all the variables represented by nodes in the graph. Thus, the Bayesian network allows a networking of probabilities, wherein the probability that a given position is the actual current position of a tracked facial feature can be inferred from past states of the facial feature and from related probabilities of related facial features.

The Bayesian network formulation of the differential pose tracking problem, then, can be represented by the illustrated dynamical graphical model 300. The state of the object (current pose) at time t is represented as $X_t$302 and the corresponding image observation is represented as $I_t$304. The sequence of states and observations up to time t are denoted by $X_t=\{X_1, \ldots, X_t\}$ and $I_t=\{I_1, \ldots, I_t\}$, and the tracking problem at time t can be regarded as an inference problem of the posterior distribution $P(X_t|I_t)$. At time t, a set of key-frames $\{Y_1, \ldots, Y_n\}$ 306 is selected, where $\{I_{t,1}, \ldots, I_{t,n}\}$ is its corresponding image observation. The node $\delta_i^t$ denotes the inter-frame pose 308, i.e., the differential state representing the relative pose between pose state $Y_i$310, and the object state (current pose) $X_t$302. For conciseness, the previous frame is denoted as the $0^{th}$ key-frame so that $Y_0$ equals $X_{t-1}$312. $I_{t,0}$ equals $I_{t-1}$314 and the corresponding differential state is $\delta_0^t$316. The Bayesian dynamical graphical model 300 and its joint distribution can be specified by Equation (1):

$$P(X_t, \{Y_i\}, \{\delta_i^t\}, I_t) = \qquad (1)$$

$$P(X_t | \{Y_i\})P(I_t, \{I_{t,i}\} | X_t, \{Y_i\}, \{\delta_i^t\})\prod_{i=o}^{n} P(\delta_i^t | X_t, Y_i)Q(Y_i)$$

From Equation (1), $P(X_t|\{Y_i\})$ represents the dynamical model that predicts the current pose $X_t$302 from the key-frame pose. $P(I_t,\{I_{t,i}\}|X_t,\{Y_i\},\{\delta_i^t\})$ represents the observation model, which measures the image likelihood given all the pose states. $P(\{\delta_i^t\}|X_t,Y_i)$ models the density of the differential pose. $Q(Y_i)$ represents the posteriors of a pose state in a previous frame or key-frames, which are assumed known at the current time t.

The above graphical model 300 generalizes the pose tracking problem and a main advantage is that the Bayesian graphical model 300 accounts for the uncertainties in the previous tracking result and in the key-frames in a principled manner. With reasonable approximations during inference, an exemplary system 100 provides an efficient and robust estimation engine.

Exemplary Engine

Figure 4:
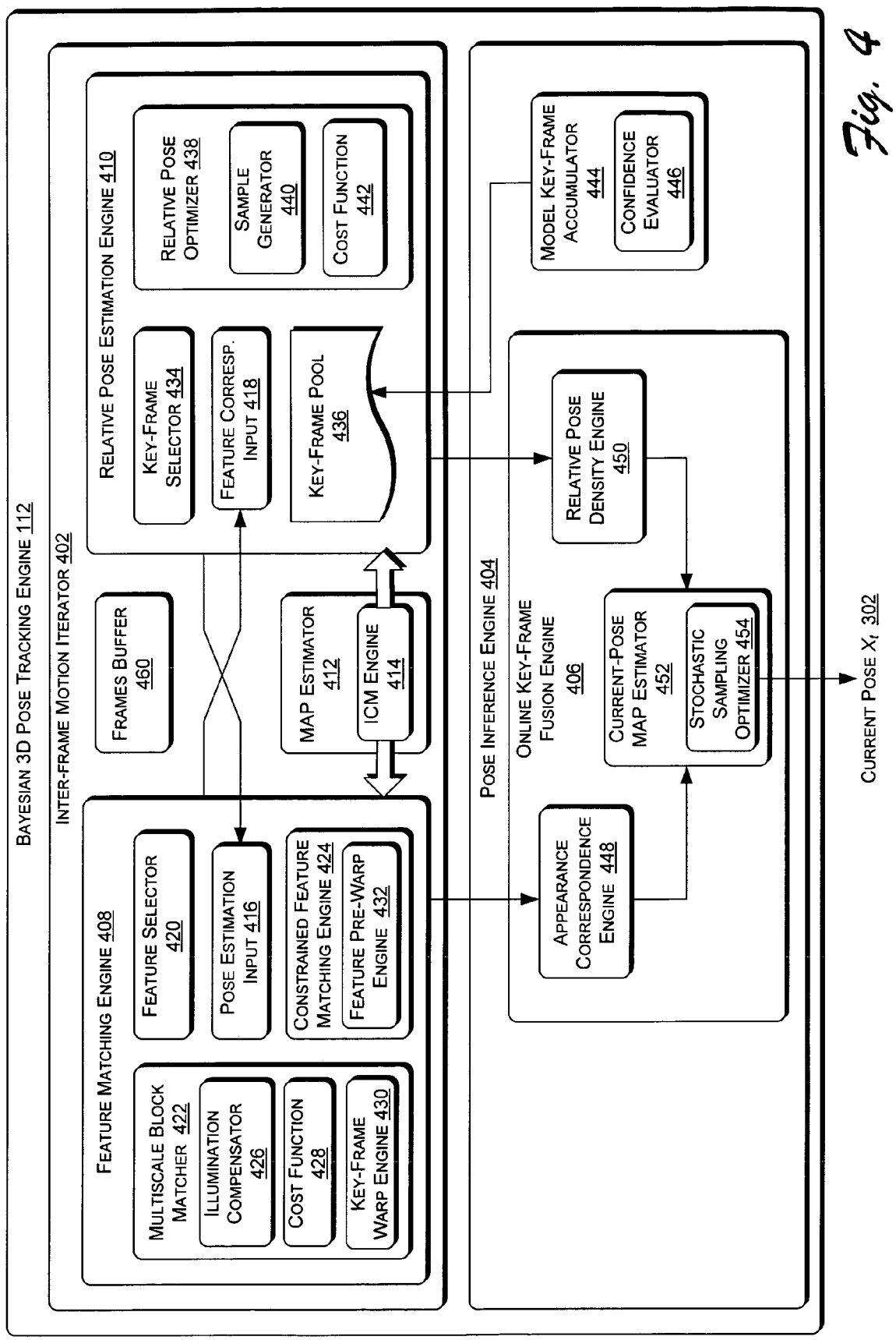
FIG. 4 is a block diagram of an exemplary Bayesian 3D pose tracking engine.

FIG. 4 shows the exemplary Bayesian 3D pose tracking engine 112 of FIG. 1 in greater detail. The illustrated configuration of the exemplary pose tracking engine 112 is meant to provide only one example arrangement for the sake of overview. Many other arrangements of the illustrated components, or similar components, are possible within the scope of the subject matter. Such an exemplary pose tracking engine 112 can be executed in software, or in combinations of software, hardware, firmware, etc.

The exemplary pose tracking engine 112 has an inter-frame motion inference engine ("inter-frame motion iterator" 402) to estimate or infer a differential pose density, i.e., both a relative pose estimation and a feature matching estimation. The inter-frame motion iterator 402 aims to find the change in pose of an object between frames, using two independent techniques. The pose tracking engine 112 also includes a pose inference engine 404 that has an online Bayesian key-frame fusion engine 406 to fuse the output of the two different techniques employed in the inter-frame motion iterator 402 to obtain the current pose, i.e., $X_t$ 302.

The inter-frame motion iterator 402 includes a feature matching engine 408 and a relative pose estimation engine 410 to perform the aforementioned two relatively independent feature matching and pose estimation techniques. A maximum aposteriori (MAP) estimator 412 has an iterated conditional modes (ICM) engine 414 that performs iterations to obtain the MAP estimation of relative pose densities. The iterations alternate back and forth between the feature matching engine 408 and the relative pose estimation engine 410. Only a few iterations are typically needed. With each iteration, the feature matching values or the relative pose values from one engine (408 or 410) become starting material for the other engine in a "hill-climbing" technique. Thus, a pose estimation input 416 receives the latest value from the relative pose estimation engine 410 and a feature correspondence input 418 receives the latest value from the feature matching engine 408.

The feature matching engine 408 also includes a feature selector 420, a multiscale block matcher 422, and a constrained feature matching engine 424. The multiscale block matcher 422 may further include an illumination compensator 426, a cost function module 428, and a key-frame warp engine 430. The constrained feature matching engine 424 may further include a feature pre-warp engine 432. These components will be described in greater detail below.

The relative pose estimation engine 410 may further include a key-frame selector 434, a key-frame pool 436, and a relative pose optimizer 438, that may further include a sample generator 440 and a cost function module 442.

The pose inference engine 404 includes the aforementioned key-frame fusion engine 406 and may further include a key-frame accumulator 444 that further includes a confidence evaluator 446.

The key-frame fusion engine 406 may further include an appearance correspondence engine 448, a relative pose density engine 450, and a current-pose MAP estimator 452, which can obtain the current pose $X_t$ 302 via a stochastic sampling optimizer 454. The exemplary pose tracking engine 112 may also include support components, such as a frames buffer 460 to store a current frame and previous frames of a video sequence.

The components of the exemplary Bayesian 3D pose tracking engine 112 introduced above will now be described in greater detail.

Figure 5:
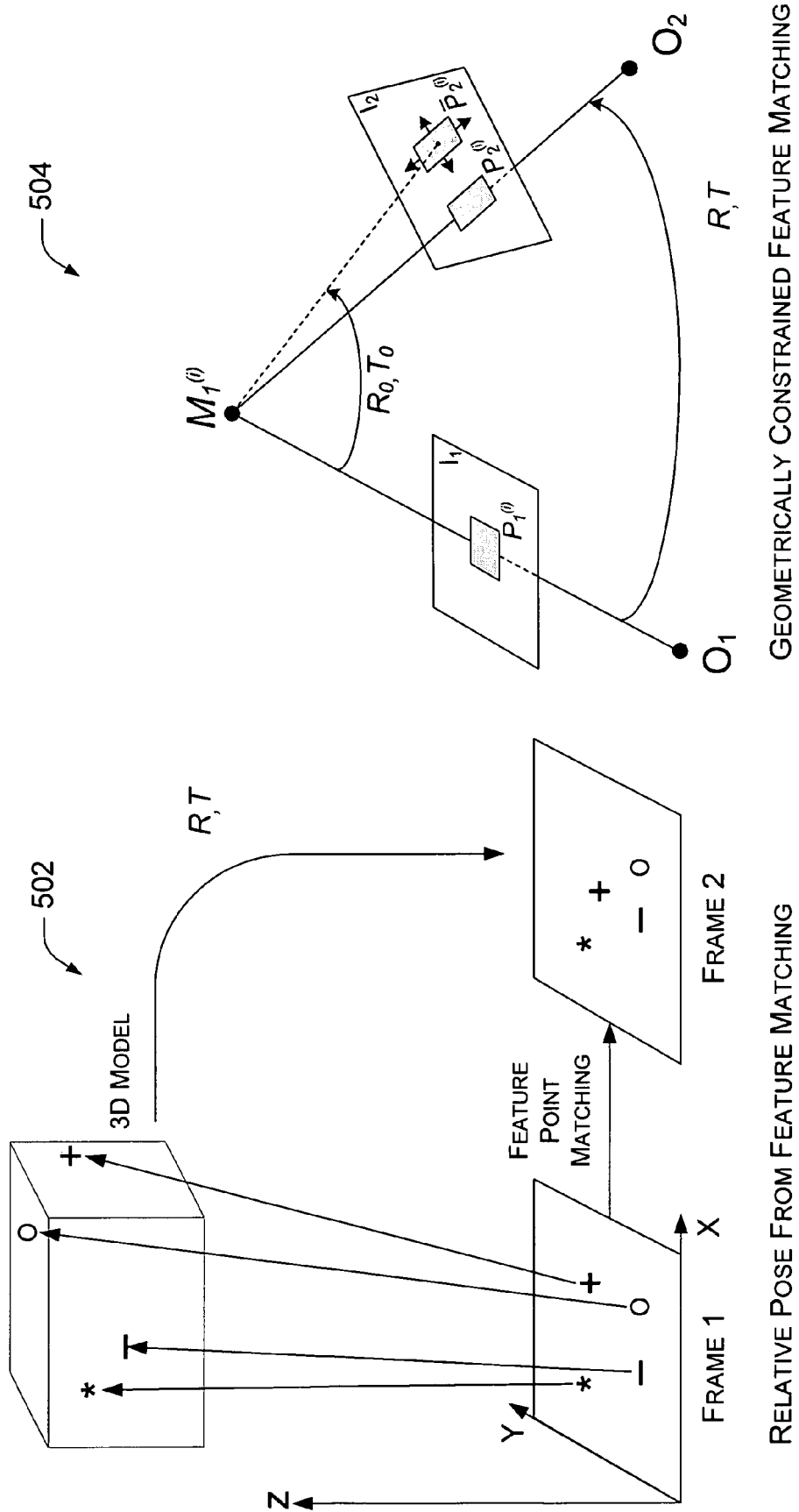
FIG. 5 is a diagram of relationships between exemplary relative pose estimation and exemplary feature matching.

The inter-frame motion iterator 402 represents motion between two frames jointly, as inter-frame feature matching and relative pose estimation, which are closely coupled. FIG. 5 shows, in general, an interrelation between feature matching and relative pose estimation. The relative pose estimation 502 can use feature matching information. Likewise, the feature matching 504 can use rough relative pose estimates. Given rough relative pose estimates, the baseline of two feature windows can be narrowed to make feature matching 504 easier and more reliable. Thus, the processes of estimating a relative pose 502 and matching inter-frame features 504 can optimize each other over several iterations. Thus, the inter-frame motion iterator 402 jointly performs feature matching and relative pose estimation iteratively, as described now in greater detail.

In one implementation, the inter-frame motion iterator 402 denotes the previous frame and the current frame as $I_1$ and $I_2$ respectively. The pose state in $I_1$ is $[R_1|T_1]$ where $R_1$ is the rotation matrix and $T_1$ is the translation vector. To calculate the relative pose state $[R|T]$ between $I_1$ and $I_2$, some good features $P_1$ for tracking are selected from $I_1$. Since the pose $[R_1|T_1]$ is assumed to be known in the previous frame, $P_1$ can be back-projected to the 3D model as shown in relative pose estimation 502 to get the corresponding 3D points, $M_1$. By denoting the correspondences of features $P_1$ in frame $I_2$ as "$P_2$," the joint posterior distribution of point matching and relative pose given current observation is defined in Equation (2):

$$P(P_2, R, T | I_1, I_2, M_1) \qquad (2)$$

The above joint distribution is difficult to handle directly due to its high dimensionality and nonlinearity, but its two conditional distributions can be effectively modeled.

The first conditional distribution in Equation (2) is $P(R, T | I_1, I_2, M_1, P_2)$, which is the distribution of the relative pose given the correspondences between 3D model points and 2D image features. In one implementation, the relative pose estimation engine 410 can model the distribution as in Equation (3):

$$P(R, T | I_1, I_2, M_1, P_2) = P(R, T | M_1, P_2) \propto \exp\left(-\sum_i \rho(e_i^2 / 2\sigma^2)\right) \qquad (3)$$

where $\rho(\cdot)$ is a robust function as in Equation (4):

$$\rho(r) = \begin{cases} r & r < T \\ 2T & r \geq T \end{cases} \qquad (4)$$

where T is a threshold, and $e_i$ is the re-projection residue on the image, as in Equation (5):

$$e_i^2 = \|P_2^{(i)} - A[R|T]M_1^{(i)}\|^2 \qquad (5)$$

$P_2^{(i)}$, $M_1^{(i)}$ is the i-th point of $P_2$ and $M_1$, respectively, and A is the camera's internal parameters matrix which can be obtained offline in advance.

Another conditional distribution is $P(P_2 | I_1, I_2, M_1, R, T)$, which is the distribution of the matching features $P_2$ in image $I_2$ given the 3D model points and pose estimation. In one implementation, the feature matching engine 408 can model this distribution as in Equation (6):

$$P(P_2 | I_1, I_2, M_1, R, T) \alpha \exp\left(-\sum_i e_i^2 - \lambda \sum_i f_i^2\right). \quad (6)$$

In Equation (6), $e_i$ is the geometric constraint term as defined in Equation (5), and $\lambda$ is a weight coefficient. The term $f_i$ is the appearance constraint, defined as follows in Equation (7):

$$f_i^2 = \sum_j \left\| c_2^{(i)} * I_1(W_i(p_2^{(i,j)})) - c_1^{(i)} * I_2(p_2^{(i,j)}) \right\|^2 \quad (7)$$

where $W_i(\cdot)$ is a 2D projective warping which can be directly determined by the relative pose R, T, 3D points $M_1^{(i)}$, and its corresponding mesh normal. The term $p_2^{(i,j)}$ is the coordinate of the j-th pixel in a window centered at $P_2^i$. This window is used for image feature matching. For illumination compensation, the terms $c_1^{(i)}$ and $c_2^{(i)}$ are the averaged intensity level of the correlation windows used in $I_1$ and $I_2$, respectively.

In one implementation of the MAP estimator 412, given the two modeled conditionals just described above, the ICM engine 414 obtains the MAP estimation of $P_2$, and R, T via Iterative Conditional Modes (ICM), which is a flexible inference technique that uses a "greedy" strategy in the iterative local minimization, and so convergence is typically guaranteed after only a few iterations. In one implementation, the ICM engine 414 performs its iterations in steps according to the following framework:
1. Initialize $P_2^0$ through generic feature matching; set i=1.
2. $(R^{(i)}; T^{(i)}) \leftarrow \arg\max_{R,T}(P(R, T|I_1, I_2, P_2^{(i-1)}, M_1))$
3. $P_2^{(i)} \leftarrow \arg\max_{p2}(P(P_2|I_1, I_2, M_1, R^{(i)}, T^{(i)}))$
4. If no convergence, then set i=i+1; go to step 2.

The multiscale block matcher 422, e.g., with an illumination compensator 426, can perform the generic feature matching (step 1). In the event of needing wide baseline matching, which typically occurs between key-frame and current frame, the key-frame warp engine 430 may first warp the image feature in the key-frame to the position at the previous frame, and then the multiscale block matcher 422 performs the multiscale feature matching to the current frame.

In one implementation, the iterations of the ICM engine 414 may use two optimizations, one in each of steps 2 and 3 above. These will now be described.

Relative Pose Optimization

In one implementation, the relative pose optimizer 438 maximizes the probability in Equation (3) (e.g., step 2 above performed by the ICM engine 414) by minimizing a cost function 442, which in one implementation is simply the negative log of the posterior in Equation (3), as shown here in Equation (8):

$$C(R, T) = \sum_i \rho(e_i^2 / 2\sigma^2). \quad (8)$$

In one implementation, the relative pose optimizer 438 employs a stochastic optimization approach extended from RANSAC (i.e., Fischler, M. A. and Bolles, R. C., "Random Sample Consensus: A Paradigm for Model Fitting with Applications to Image Analysis and Automated Cartography," Comm. of the ACM 24, 381-395, 1981). That is, from the feature pairs set $\{P_2^{(i)}, M_2^{(i)}\}$, the sample generator 440 produces a number of samples, each sample generated by randomly selecting a minimum set of point pairs that can recover the relative pose R, T. The cost function in Equation (8) can thus be evaluated and the [R|T] associated with the sample of minimum cost is the optimization result. In one implementation, the relative pose optimizer 438 uses the POSIT algorithm to recover the relative pose from 2D-to-3D point matches (DeMenthon, D. F. and Davis, L. S., "Model-Based Object Pose in 25 Lines of Code," IJCV 15, 123-141, 1995). In one implementation, the minimum number of point pairs is four in order to recover the pose. The relative pose optimizer 438 can refine the final pose by applying the orthogonal iteration method on the inlier point pairs (Lu, C. P., Hager, G., and Mjolsness, E., "Fast and globally convergent pose estimation from video images," IEEE Trans. PAMI 22(6), 610-622, 2000).

Geometrically Constrained Feature Matching

In one implementation, the feature matching engine 408 maximizes the probability in Equation (6) (e.g., step 3 above performed by the ICM engine 414) by minimizing a cost function 428, which in one implementation is simply the negative log of the posterior in Equation (6), as shown here in Equation (9):

$$C(P_2) = \sum_i e_i^2 + \lambda \sum_i f_i^2. \quad (9)$$

In one implementation, the constrained feature matching engine 424 can perform the minimization in Equation (9) in image $I_2$ as shown in the feature matching 504 of FIG. 5. With known R, T, the feature pre-warp engine 432 can pre-warp the feature image in $I_1$ to the position in image $I_2$. Then the multiscale block matcher 422 performs block matching starting from $\overline{P}_2^{(i)}$ using Equation (9) as matching cost. Since the multiscale block matching can be done approximately over integer image coordinates, no image interpolation is required and the resulting matching technique is extremely efficient, rendering the feature matching engine 408 particularly efficient for real-time processing.

Bayesian Online Key-frame Fusion

The (online) key-frame fusion engine 406 infers the current pose $X_t$ 302 based on the inter-frame motion estimation of the inter-frame motion iterator 402. Since Equation (1) above gives the joint distribution of the dynamical graphical model 300 of the Bayesian network, the posterior distribution of the current pose $X_t$ 302 can be written, based on Equation (1). However, this posterior distribution is of complex form and not very suitable for on online engine as it includes integrals. However, in one implementation, the online key-frame fusion engine 406 embodies some assumptions specific to the task of pose tracking and thereby offers an efficient inference engine.

MAP Estimation of the Current Pose

Some definitions are now provided to introduce the pose inference engine 404, that is, a composition operator (o), a differentiation operator (~), and a distance measure associated with a pose are now defined. In one implementation, the pose inference engine 404 uses a quaternion representation of rotation, so that $X_1=(q, t)=(q_0, q_1, q_2, q_3, t_1, t_2, t_3)$, and $X_2=(r, s)=(r_0, r_1, r_2, r_3, s_1, s_2, s_3)$, where q, r is the quaternion representation of rotation and t, s is the translation vector. Equations (10), (11), and (12) then define:

$$X_1 \circ X_2 = (q \wedge r, R(q) \cdot s + t), \qquad (10)$$

$$X_1 \sim X_2 = (q \wedge \bar{r}, t - R(q \wedge \bar{r}) \cdot s), \qquad (11)$$

$$d(X_1, X_2) = \frac{\|\gamma\|^2}{\sigma_r^2} + \frac{\|t-s\|^2}{\sigma_t^2}, \qquad (12)$$

where ^ is the quaternion multiplication operator, $\bar{r}$ is the conjugate of r, R(q) is the rotation matrix represented by the quaternion q, λ is the vector part of $q\hat{}\bar{r}$ and $\sigma_r, \sigma_t$ are parameters to normalize the dimension size of rotation and translation respectively.

Then, in one implementation, three assumptions are made in order to simplify the estimation of the current pose $X_t$ 302, the three assumptions are:

1. The inter-frame pose $\delta_i^t$ 308 representing the relative pose between pose state $Y_i$ 310, and object state (current pose) $X_t$ 302 is regarded as a hidden state related to current pose $X_t$ 302 so that the MAP state of the current pose $X_t$ 302 can be obtained through maximization of the joint distribution of $P(X_t, \{\delta_i^t\})$.

2. The poses of the key-frames are well-estimated, their pose states are unimodal and have very small variance.

3. The density of inter-frame pose $\delta_i^t$ 308 can be specified by feature matches that maximize the joint distribution of inter-frame motion, which corresponds to $P(\delta_i^t|X_t, Y_i) \approx P(\delta_i^t|M_i, \hat{P}_i^t)$.

In assumption 3, $(\delta_i^t|M_i, \hat{P}_i^t)$ is a symbol set for the i-th keyframe for time t which corresponds to $([R|T], M_1, P_2)$ in the inter-frame motion case, and $P(\delta_i^t|M_i, \hat{P}_i^t)$ is specified in Equation (3), where $(\hat{P}_i^t, \hat{\delta}_i^t) = \arg\max_{P_i^t, \delta_i^t} P(P_i^t, \delta_i^t|I_t, I_i, M_i)$. This assumption indicates that pose state $Y_i$ 310 fully determines $M_i$ and $X_t$ determines $\hat{P}_i^t$.

With the three assumptions just described, then from Equation (1), the formulation of the MAP estimation of the current pose $X_t$ 302 is described by Equation (13):

$$\hat{X}_t \approx \arg\max \int_{\{Y_i\}} P(X_t, \{Y_i\}, \{\delta_i^t\}, I_t) d(\{Y_i\}) \qquad (13)$$

$$\approx \arg\max P(X_t|\{\hat{Y}_i\}) P(I_t, \{I_{t,i}\}|X_t, \{\hat{Y}_i\}, \{\delta_i^t\}) \prod_{i=0}^{n} P(\{\delta_i^t\}|M_i, \hat{P}_i^t).$$

The first approximation in Equation (13) corresponds to assumption 1, the second approximation corresponds to assumptions 2 and 3. Since the temporal distance between the current frame and the key-frame can be large and the prediction is then difficult, the dynamical model can accordingly be put on hold, in favor of Equation (14). Since current pose $X_t$ 302 is a composition of $Y_i, \delta_i^t$, the current pose MAP estimator 452 can approximate Equation (13) as:

$$\hat{X}_t = \arg\max Q(X_t) \qquad (14)$$

$$= \arg\max \left( \ln(P(I_t, \{I_{t,i}\}|X_t, \{\hat{Y}_i\})) + \sum_{i=o}^{n} \ln(P(X_t \sim \hat{Y}_i|M_i, \hat{P}_i^t)) \right).$$

There are two terms of interest in Equation (14). The appearance correspondence engine 448 models the first term, which corresponds to the likelihood of image appearance correspondence given the pose estimate, which can be modeled based on the appearance constraint specified in Equation (7) over semantic object features, with a small displacement relaxation. The relative pose density engine 450 models the second term, which corresponds to the density of relative pose, given the feature point (non-semantic) matching. This second term can be evaluated if the relative pose is estimated, with each term in this evaluation function having the same form as specified in Equation (3), which finally depends on the geometric constraint in Equation (5).

Finally, the stochastic sampling optimizer 454 obtains the MAP estimate of current pose $X_t$ 302 in Equation (14). First, the stochastic sampling optimizer 454 generates sample candidates of current pose $X_t$ 302 from an importance distribution in the form of a Gaussian centered at $(\hat{\delta}_0^t \circ Y_0)$, then Equation (14) can be evaluated and each sample given a resulting weight. The sample with the highest weight is output by the MAP estimator 452 as the MAP estimation result. From another perspective, candidate samples of the current pose $X_t$ 302 are obtained from a proposal distribution, and the proposal distribution is evaluated via Equation (14) to get its MAP states. The proposal distribution can be obtained by obtaining the MAP estimation of inter-frame differential pose states and the evaluation function can be obtained once the MAP estimation of inter-frame feature matching is obtained from the inter-frame motion iterator 402. Since each term in the evaluation function has a very simple form, the pose inference engine 404 and associated estimation processes are quite efficient for real-time processing.

Exemplary Key-frame Selection

The key-frame accumulator 444 plays an important role since the choice of key-frames can affect the previous assumptions that the poses of the key-frames are well-estimated, their pose states are unimodal and have very small variance, i.e., that their distribution is unimodal and peaks around their MAP states. So the key-frame accumulator 444 aims to select key-frames that have high confidence from previously tracked frames. Since $Q(X_t)$ in Equation (14) specifies such a confidence, if the confidence evaluator 446 determines that $Q(\hat{X}_t)$ is larger than a threshold, the key-frame accumulator 444 adds the frame corresponding to current pose $X_t$ 302 as a key-frame to the key-frame pool 436.

After some key-frames exist in the key-frame pool 436, the key-frame selector 434 can select the best key-frames for the current frame's pose estimation (i.e., the best key-frames for the current frame are selected before the pose estimation of the current frame). The choice of the best key-frames for the current frame depends on the difference in pose between the key-frame and the current frame and on and the temporal distance between the key-frame and the current frame. The difference in pose may affect the result of inter-frame motion estimation, while the difference in temporal distance may affect the drift of using the key-frame itself. Error accumulation can be quite large during online tracking if there is no key-frame constraint. But by using key-frames, the online key-frame fusion engine 406 can significantly reduce drift error.

In one implementation, the difference in pose between the key-frame and current frame is ideally as small as possible and the temporal distance between the key-frame and the current frame is ideally as large as possible. Equation (14) defines a measure to reflect these two ideals:

$$m(Y) = \exp(-d(Y, \hat{X}_{t-1})/\sigma^2) \exp(-n_0/\min(n_0, n_x - n_y)) \qquad (15)$$

where $\hat{X}_{t-1}$ is the estimated pose of the previous frame, $n_x$ and $n_y$ are the temporal frame index of the current frame and the key-frame respectively, and $n_0$ is a parameter to control the temporal difference between the selected key-frame and the current frame. The key-frame selector 434 constructs a set that includes key-frames with the largest measures or key-frames that are within the specified pose distance from current pose. Then the key-frame selector 434 selects several key-frames from the above set that have maximal temporal distance to the current frame.

Exemplary Methods

Figure 6:
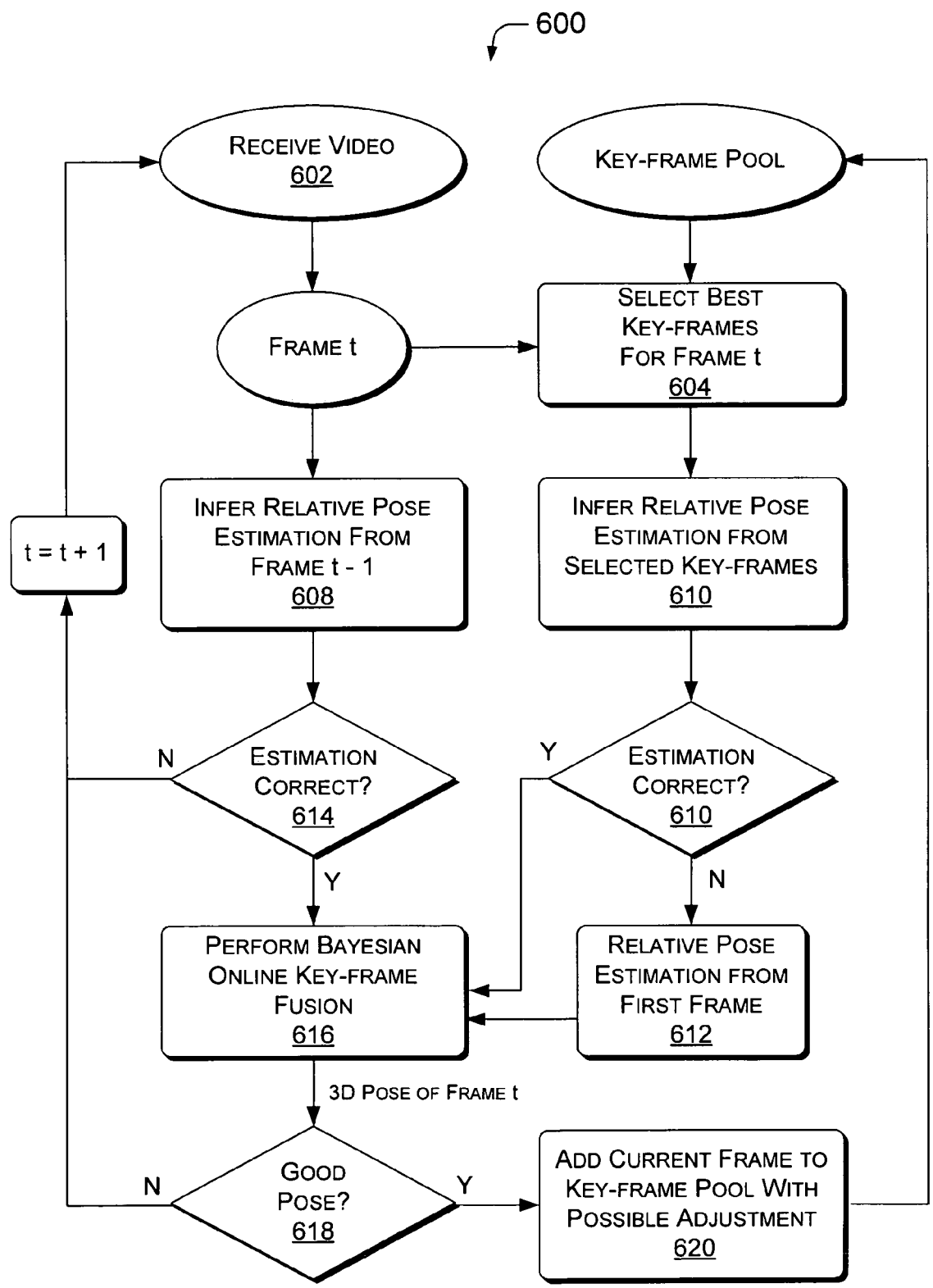
FIG. 6 is a flow diagram of an exemplary method of Bayesian 3D pose tracking.

FIG. 6 shows an exemplary method 600 of online Bayesian 3D pose tracking. In the flow diagram, the operations are summarized in individual blocks. Parts of the exemplary method 600 may be performed by software, hardware, firmware, etc., or combinations thereof, for example, by components of the exemplary Bayesian 3D pose tracking engine 112.

At block 602, video feed is received. For example, the video may be received from a single camera shooting the visual object being tracked.

At block 604, key-frames to be associated with current frame t of the video sequence are selected from a key frame pool.

At block 606, a first relative pose estimation for the current frame is inferred from a pose difference between the current frame and one or more of the selected key-frames.

At block 608, a relative pose estimation is also inferred from feature matching between current frame t and frame t−1, i.e., from comparison of the current frame's visual object features with the same features on the preceding frame t−1.

At block 610, the relative pose estimation derived from the one or more key-frames is evaluated to find out if the estimation is correct within a threshold.

At block 612, if the estimation derived from key-frames is not correct enough, then a relative pose estimation is made instead from a pose difference with the first frame of the video sequence or for the first frame in a selected time interval.

At block 614, the relative pose estimation derived from the preceding frame is also evaluated to find out if the estimation is correct within a threshold. If the estimation is not correct enough, then the estimation based on the preceding frame may be ignored for the current frame.

At block 616, Bayesian key-frame fusion is performed on the preceding relative pose estimate(s) 610 and 614 to determine the current 3D pose for the current frame.

At block 618, if the obtained 3D pose is worthy to be used as a model for obtaining future relative pose estimates, then at block 620 the current frame is added to a key-frame pool for future use as a key-frame. The method then increments to the next frame, which becomes the current frame, and begins again.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for real-time Bayesian 3D pose tracking. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
representing a 3-dimensional (3D) tracking of a visual object in a video sequence using a computer and as a probabilistic graphical model which includes a dynamical Bayesian network, wherein the representing the 3D tracking includes establishing a 3D model of the visual object, wherein visual features of the visual object are represented by the 3D model points;
inferring a current pose of the visual object in a current frame of the video sequence from the probabilistic graphical model based on a posteriors of pose states in previous frames of the video sequence using the computer;
iteratively refining estimations associated with the first and second conditional distributions of a joint distribution of the dynamical Bayesian network using the computer;
wherein the first conditional distribution comprises a distribution of a relative pose, given correspondences between the 3D model points and 2-dimensional (2D) features of the visual object;
wherein the second conditional distribution comprises a distribution of matching features of the visual object between two frames of the video sequence, given the 3D model points and given a relative pose estimation associated with the first conditional distribution; and
using a Bayesian fusion of the iteratively refined estimations using the computer to obtain the current pose of the visual object, wherein the iteratively refined estimations include an iteratively refined relative pose estimation and an iteratively refined feature matching estimation.

2. The method as recited in claim 1, wherein during iterations of the iterative refining of the estimations, the relative pose estimation is used to refine a feature matching estimation and wherein the feature matching estimation is used to refine the relative pose estimation.

3. The method as recited in claim 1, further comprising optimizing the relative pose estimation using the computer by minimizing a cost function representing the negative log of a posterior associated with the distribution of the relative pose.

4. The method as recited in claim 1, further comprising optimizing the feature matching estimation using the computer by minimizing a cost function representing the negative log of a posterior associated with the distribution of the matching features of the visual object between two frames of the video sequence.

5. The method as recited in claim 1, wherein the relative pose is in relation to a key-frame, wherein the key-frame comprises a previous frame of the video sequence selected for a known pose of the visual object in the key-frame.

6. The method as recited in claim 5, further comprising selecting a candidate frame of the video sequence to be a key-frame based on a confidence measure applied to a pose of the visual object in the candidate frame using the computer.

7. The method as recited in claim 5, further comprising selecting a key-frame for determining a relative pose estimate for a current frame using the computer, wherein the key-frame is selected from a pool of key-frames based on a low difference of pose between the key-frame and the current frame and based on a high temporal distance between the key frame and the current frame.

8. The method as recited in claim 7, further comprising 3-dimensionally tracking the visual object in real-time using the computer by inferring in real-time a current pose of the visual object for each frame of the video sequence.

9. The method as recited in claim 8, further comprising minimizing a drift error of the 3D tracking, using the computer by using key-frame constraints.

10. The method as recited in claim 5, further comprising:
 warping an image feature of the key-frame to a position of the image feature in a previous frame using the computer; and
 performing the feature matching from the warped position to a position of the image feature on the current frame using the computer.

11. The method as recited in claim 1, further comprising pre-warping a first position of an image feature in a previous frame to a second position for the image feature on the current frame based on the relative pose estimation using the computer, wherein the feature matching is initiated from the second position.

12. The method as recited in claim 1, wherein the Bayesian fusion includes an Iterated Conditional Modes (ICM) process for obtaining a maximum aposteriori (MAP) estimation of the current pose.

13. A Bayesian 3D pose tracking engine, comprising:
 an inter-frame motion iterator for inferring a current relative pose of a visual object in a video sequence, including:
  a relative pose estimation engine for estimating the relative pose in relation to one or more key-frames, each key-frame having a known pose of the visual object, and
  a feature matching engine for estimating the relative pose based on matching features of a current frame with features of a previous frame; and
 a Bayesian fusion engine to infer a current pose of the visual object:
  by maximizing a likelihood of matched features of the visual object between the current frame and the previous frame, given the relative pose estimate; and
  by maximizing a relative pose density given the matching features;
  wherein the Bayesian 3D pose tracking engine is implemented in hardware.

14. The Bayesian 3D pose tracking engine as recited in claim 13, further comprising a constrained feature matching engine to optimize the feature matching and to reduce drift error in the pose tracking.

15. The Bayesian 3D pose tracking engine as recited in claim 13, further comprising a relative pose optimizer to optimize the relative pose based on minimizing a cost function.

16. The Bayesian 3D pose tracking engine as recited in claim 13, wherein the inter-frame motion iterator alternates between the feature matching engine and the relative pose estimation engine by using results from one engine to refine the results of the other engine during each iteration.

* * * * *